(12) United States Patent
Bankowski et al.

(10) Patent No.: US 9,891,063 B2
(45) Date of Patent: Feb. 13, 2018

(54) AUTOMATED POINT OF INTEREST UPDATES

(71) Applicant: Ford Global Technologies, LLC, Dearborn, MI (US)

(72) Inventors: Stefan Bankowski, Royal Oak, MI (US); Edward Wehrman, Leesburg, VA (US); Elizabeth Halash, Dearborn, MI (US); Julius Marchwicki, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 14/331,770

(22) Filed: Jul. 15, 2014

(65) Prior Publication Data

US 2016/0018232 A1    Jan. 21, 2016

(51) Int. Cl.
*G01C 21/34* (2006.01)
*G01C 21/36* (2006.01)
*H04W 4/02* (2009.01)

(52) U.S. Cl.
CPC ..... *G01C 21/3476* (2013.01); *G01C 21/3614* (2013.01); *G01C 21/3682* (2013.01); *G01C 21/3688* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,335,643 B2 | 12/2012 | Vandivier et al. | |
| 2009/0271400 A1* | 10/2009 | Uchida | G01C 21/32 |
| 2012/0041673 A1* | 2/2012 | Vandivier | G01C 21/3614 |
| | | | 701/426 |
| 2012/0197523 A1 | 8/2012 | Kirsch | |
| 2013/0144471 A1 | 6/2013 | Min et al. | |
| 2013/0223614 A1 | 8/2013 | Tuchman et al. | |
| 2013/0253963 A1 | 9/2013 | Harris et al. | |
| 2014/0350833 A1* | 11/2014 | Park | H04W 4/02 |
| | | | 701/123 |

(Continued)

OTHER PUBLICATIONS

Bruce Gain, et al., Sep. 1, 2011, "RemoteLink App Finds an Address, Sends it to Your Car," http://www.pcworld.com/article/239273/remotelink_app_finds_an_address_sends_it_to_Your_Car.

(Continued)

*Primary Examiner* — Lail A Kleinman
(74) *Attorney, Agent, or Firm* — Jennifer M. Stec; Brooks Kushman P.C.

(57) ABSTRACT

A nomadic device may be configured to connect to a vehicle computing system (VCS) over a local connection and to a location service over a wide-area connection, receive point-of-interest data over the wide-area connection from the location service, and provide the point-of-interest data to the VCS over the local connection for use by a navigation application of the VCS. The VCS may be configured to connect over a local connection to a nomadic device configured to execute a location application to connect to a location service over a wide-area connection, receive user interface input requesting point-of-interest data for use by a navigation application of the VCS, and responsive to the input, send a command over the local connection to request the point-of-interest data from the location application.

18 Claims, 6 Drawing Sheets

(56) References Cited

U.S. PATENT DOCUMENTS

| | | | | |
|---|---|---|---|---|
| 2015/0095327 A1* | 4/2015 | Sakuragawa | ...... | G01C 21/3679 707/727 |
| 2015/0268801 A1* | 9/2015 | Song | .................. | G01C 21/3688 701/1 |
| 2015/0316391 A1* | 11/2015 | Zhou | .................. | G01C 21/3688 701/526 |

OTHER PUBLICATIONS

Kia MyUVO—My Points of Interest (POI), last visited Mar. 31, 2014, https://www.myuvo.com/support/uvo-eservices-navigation/convenience/my-points-of-interest.
POI Factory, last visited Mar. 31, 2014, "POI Files for United States and Elsewhere", http://www.poi-factor.com/poifiles.

* cited by examiner

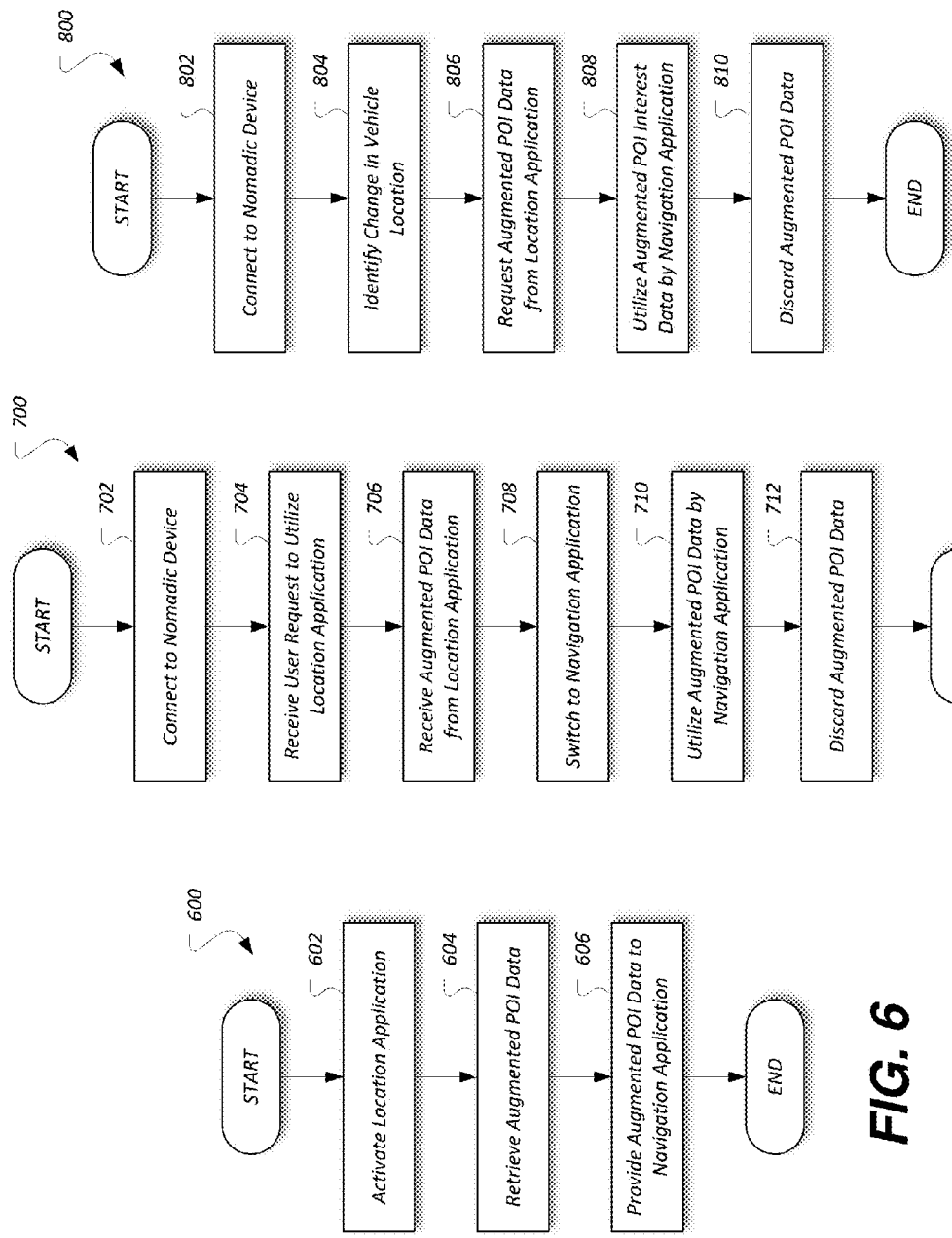

AUTOMATED POINT OF INTEREST UPDATES

TECHNICAL FIELD

This disclosure generally relates to automated updating of point-of-interest data for vehicle navigation systems.

BACKGROUND

Navigation systems, both vehicle-installed and portable, may offer a point-of-interest (POI) search as an easy and quick way of searching for well-known destination points. POIs can include hotels, restaurants, amusements parks, coffee shops, and the like. When a POI is selected, the POI can be set as a final destination or a "waypoint," i.e., an intermediary point along a route, and the navigation system may access a database to retrieve map data to update the route. However, the database of POI data may become out of date, reducing the utility of the navigation system over time.

SUMMARY

In a first illustrative embodiment, a nomadic device executing a location application and configured to connect to a vehicle computing system (VCS) over a local connection and to a location service over a wide-area connection, receive point-of-interest data over the wide-area connection from the location service, and provide the point-of-interest data to the VCS over the local connection for use by a navigation application of the VCS.

In a second illustrative embodiment, a system includes a vehicle computing system (VCS) configured to connect over a local connection to a nomadic device configured to execute a location application to connect to a location service over a wide-area connection, receive user interface input requesting point-of-interest data for use by a navigation application of the VCS, and responsive to the input, send a command over the local connection to request the point-of-interest data from the location application.

In a third illustrative embodiment, a system includes a vehicle computing system (VCS) configured to execute a navigation application to provide a request for point-of-interest information to a nomadic device connected to the VCS over a local connection, the request including query information including at least one of a current location of the vehicle and a category of business, receive the point-of-interest data from the nomadic device, and utilize the point-of-interest data to update point-of-interest information maintained by the VCS for use by the navigation application.

BRIEF DESCRIPTION OF THE DRAWINGS

FIG. 6 illustrates an exemplary process for providing augmented point-of-interest data from the nomadic device to the vehicle-based computing system;

FIG. 7 illustrates an exemplary process for utilizing the location application to provide augmented point-of-interest data responsive to user input; and FIG. 8 illustrates an exemplary process for utilizing the location application to automatically provide augmented point-of-interest data to the navigation application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mobile application on a user's mobile device may be configured to integrate with a telematics system of a vehicle. This integration may allow a driver or other user of the vehicle to access mobile application features from within the vehicle human-machine interface (HMI). In some cases, the mobile application may desire to provide POI data to be utilized by a navigation application of the vehicle. As one possibility, the POI data may be provided from the mobile application to the vehicle responsive to receipt of a driver request for POIs, such as a request for a local gas station or restaurant. As another possibility, the vehicle may be configured to automatically request the mobile application to retrieve POI data from a navigation update server based on criteria such as vehicle location and point-of-interest category. This may allow for the vehicle navigation system to display the most up-to-date POI data for the current area. In some cases, the updated POI data may be used to incrementally update the vehicle's saved map or POI data. In other cases, the received POI data may be session-based and discarded by the vehicle when the navigation application is terminated.

Figure 1:
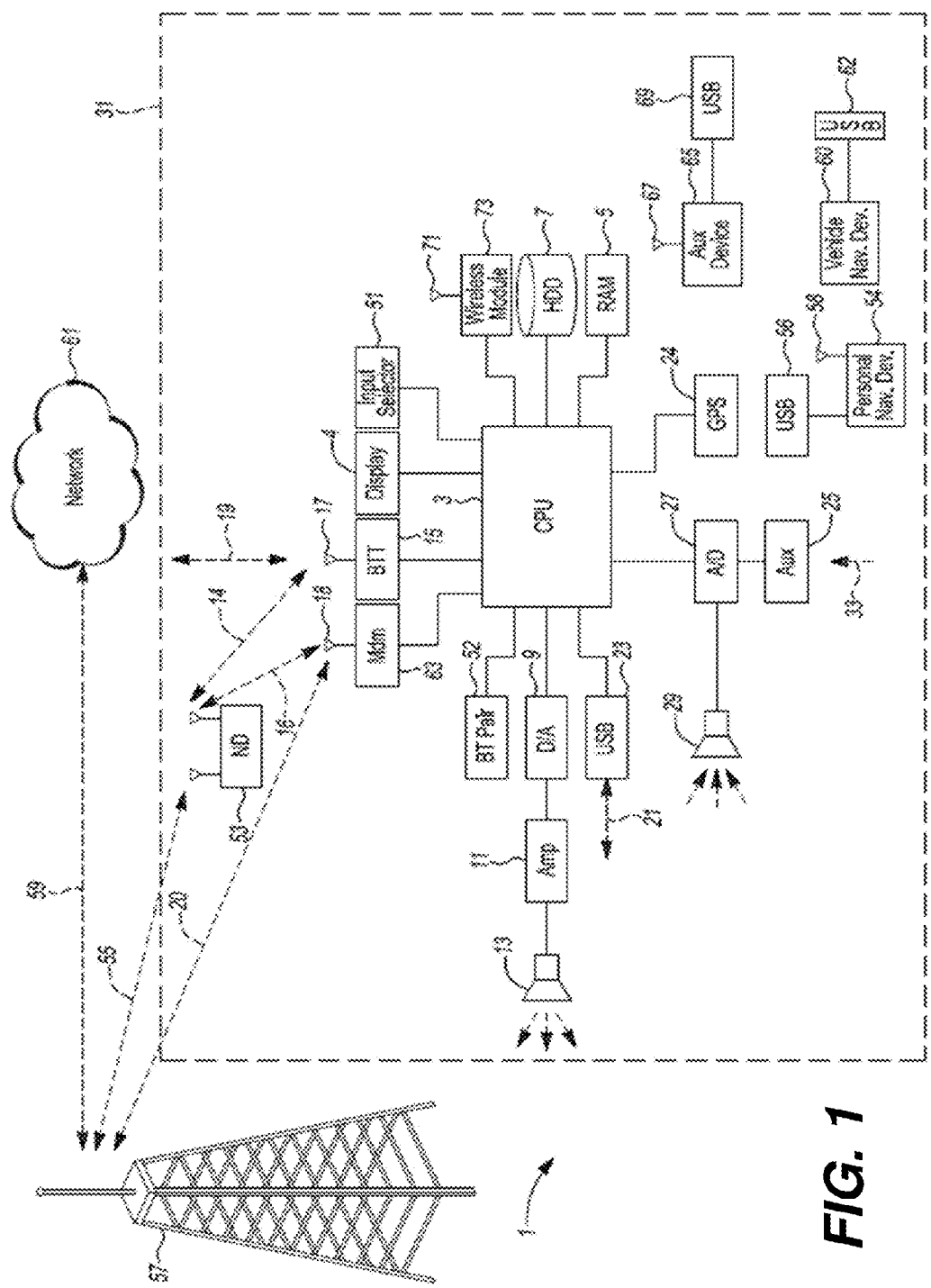
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection.

Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
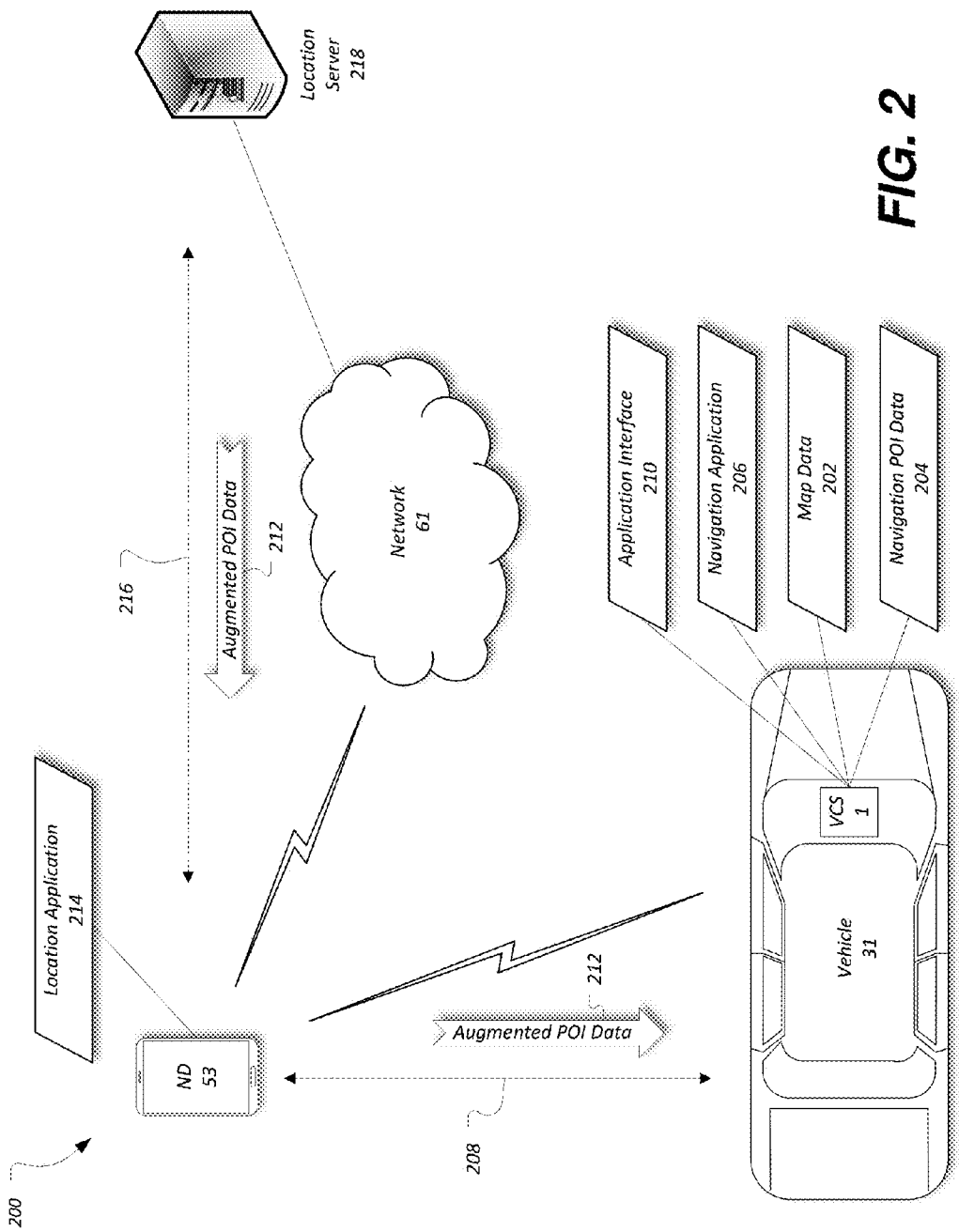
FIG. 2 illustrates an exemplary system for providing augmented point-of-interest information from a location application for use by a navigation application of the vehicle.

FIG. 2 illustrates an exemplary system 200 for providing augmented POI information 212 from a location application 214 for use by a navigation application 206 of the vehicle 31. As illustrated, the system 200 includes a nomadic device 53 hosting the location application 214 and in communication with a location server 218 via a data connection 216 over the network 61. The system 200 further includes a connected application interface 210 of the VCS 1 configured to allow the VCS 1 to integrate with and control connected applications (such as the location application 214) via a local data connection 208. The system 200 further includes augmented POI data 212 to be retrieved from the location server 218 by the location application 214, to be provided to VCS 1 for use by the navigation application 206 along with the map data 202 and POI data 204 of the VCS 1. It should be noted that the illustrated system 200 is merely exemplary, and more, fewer, and/or differently located elements may be used.

The map data 202 may include information that may be queried to provide map information to a viewer of a display. The map data 202 may include, for example, information regarding roads that may be traversed by the vehicle 31 (e.g., location, name, endpoints, speed limit, traffic, etc.), as well as geographic features of the area surrounding the roadway (e.g., water, parks, desert, mountains, building outlines, etc.). The vehicle 31 may be configured to maintain the map data 202 in persistent storage 7 of the VCS 1. As one example, the vehicle 31 may load the map data 202, as needed, off a DVD. As another example, the vehicle 31 may maintain the map data 202 on flash or HDD storage.

The POI data 204 may include information about possible destinations for the vehicle 31, such as location information (e.g., GPS coordinates, street address, etc.), name information (e.g., business name, names of resident, etc.), as well as other information about the POI (e.g., hours of operation, images of the POI, web, e-mail or other Internet information associated with the POI, goods available at the POI such as a restaurant menu, reviews or rating of the POI, etc.). As with the map data 202, the vehicle 31 may be configured to maintain the POI data 204 in persistent storage 7 of the VCS 1.

The navigation application 206 may be configured to display the map data 202 and the POI data 204 via the HMI of the vehicle 31 (e.g., via display 4). When displayed, the navigation application 206 may be configured to illustrate the map data 202 and POI data 204 for an area surrounding the vehicle 31, as well as a representation of the vehicle 31 on the map at the current vehicle 31 location.

The navigation application 206 may be further configured to utilize the map data 202 to identify routes for the vehicle 31. As an example, the navigation application 206 may be configured to identify a path along the road segments of the map data 202 from a current vehicle 31 location to a location of a POI the driver wishes to reach. The navigation application 206 may be further configured to display the route in the HMI of the vehicle 31, such as by way of a highlighted path on the displayed map data 202, or as a listing of one or more driving instructions that, when followed, take the vehicle 31 the intended destination or waypoint POI.

In addition to applications installed to the VCS 1 (such as the navigation application 206), the VCS 1 may be further configured to interact with connected applications hosted by the nomadic device 52. To facilitate the integration of such connected applications with the HMI of the VCS 1, the VCS 1 and/or nomadic device 53 may set up the local data connection 208 between the nomadic device 53 and the VCS 1. As an example, for a nomadic device 53 running the Android operating system maintained by the Open Handset Alliance of Silicon Valley, Calif., the data connection 208 may be established via a wireless Bluetooth connection. As another example, for a nomadic device 53 running the iOS operating system maintained by Apple, Inc. of Cupertino, Calif., the data connection 208 may additionally or alternately be established over a wired USB connection (not shown).

Once connected via the connection 208, the application interface 210 of the VCS 1 may provide communication services between the VCS 1 and the nomadic device 53. As one example, the application interface 210 may support the querying by the VCS 1 for a list of the connected applications available on the nomadic device 53 and compatible with VCS 1 control. As another example, the application interface 210 may facilitate arbitration of communication resources of the connection 208 between the VCS 1 and the nomadic device 53, to allow the connected applications of the nomadic device 53 to send and receive data from the VCS 1. As yet a further example, the application interface 210 may support the addition of HMI screens and voice commands to the HMI of the VCS 1 by the connected applications executed by the paired nomadic device 53. A non-limiting example of an implementation of an application interface 210 may be the SYNC APPLINK API provided by THE FORD MOTOR COMPANY. The nomadic device 53 may further be configured to establish a wide-area data connection 216 (e.g., an Internet connection) between the connected applications of the nomadic device 53 and various networked devices available via the network 61.

An additional service available via the application interface 210 may be the provisioning of augmented POI data 212 from connected applications of the nomadic device 53 to the navigation application 206 of the vehicle 31. For example, the application interface 210 may include one or more application functions that may be callable by a connected application, to allow the connected application to provide the augmented POI data 212 to the VCS 1 for use by the navigation application 206. As another example, the application interface 210 may include one or more application functions that may be callable by the VCS 1, to request augmented POI data 212 according to vehicle 31 location or other POI attributes such as POI category. In some cases, the application interface 210 may include functionality configured to allow the connected applications to invoke the navigation application 206 to provide mapping or other navigation services with regard to augmented POI data 212 provided from the connected applications to the VCS 1.

The location application 214 may be one such connected application available on the nomadic device 53. The location application 214 may be configured to provide location features to the VCS 1 via the application interface 210 to the VCS 1. For example, the location application 214 may be configured to integrate with the HMI of the VCS 1 by way of the application interface 210. The integration of the location application 214 into the vehicle HMI may include the addition of application-specific user interface screens to the vehicle HMI, as well as the addition of application-specific voice commands to the vehicle HMI.

As one example, the location application 214 may be a restaurant locator application 214 configured to provide the driver with reviews of local restaurants, as well as an ability to pass augmented POI data 212 regarding the reviewed restaurants to the navigation application 206 for routing to the restaurants. As another example, the location application 214 may be an application configured to automatically download and provide augmented POI data 212 regarding the vehicle 31 surroundings (e.g., from the location server 218) to the navigation application 206.

The location server 218 may accordingly be configured to maintain a data store of augmented POI data 212 that may be queried by location applications 214 according to criteria such as current vehicle 31 location (e.g., within a distance from the current GPS coordinates of the vehicle 31, within a zip code in which the vehicle 31 is currently located, etc.) and POI category (e.g., restaurants, pizza parlors, gas stations, grocery stores, discount retailers, malls, municipal offices, etc.). Responsive to the received queries, the location server 218 may be configured to determine which augmented POI data 212 matches the received criteria, and respond to the query with the located augmented POI data 212. Further details of the operation of the location application 214 are discussed in detail below with respect to FIGS. 3-7.

Figure 3:
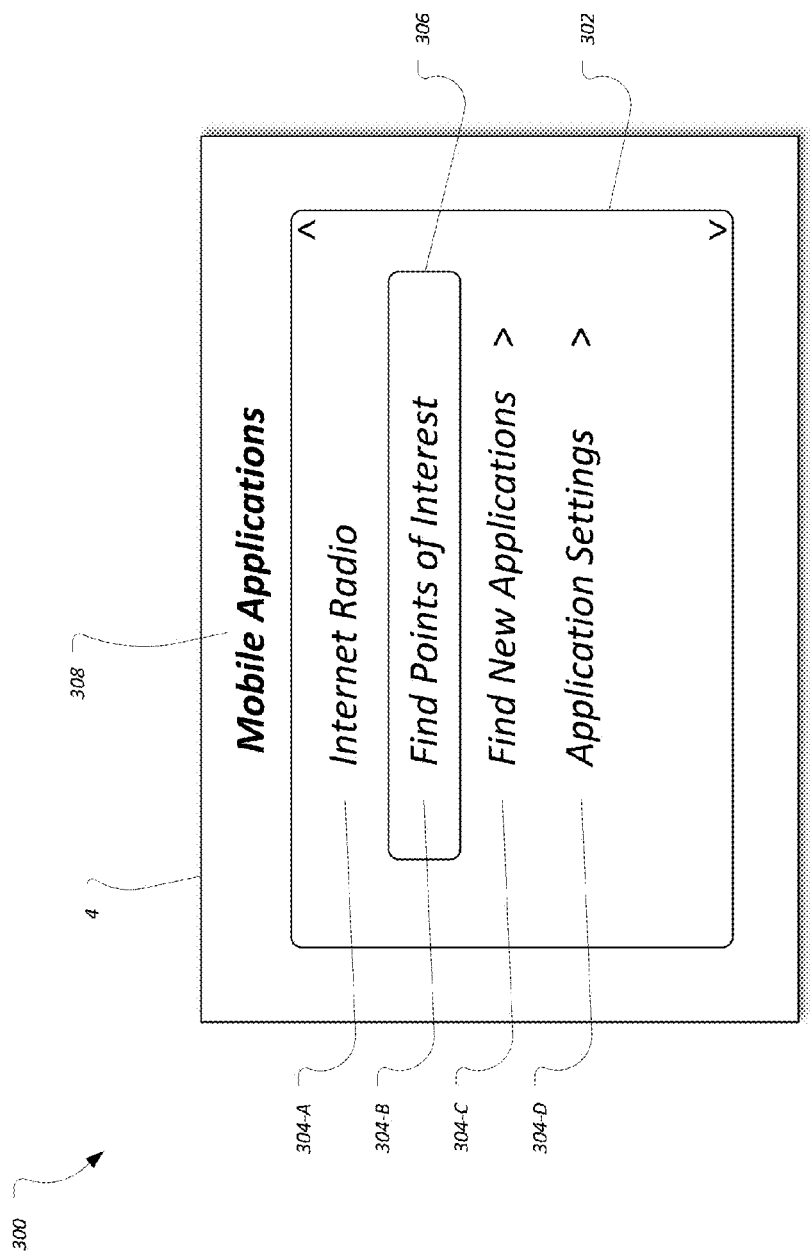
FIG. 3 illustrates an exemplary user interface of the vehicle-based computing system from which connected applications are selected.

FIG. 3 illustrates an exemplary user interface 300 of the VCS 1 from which connected applications are selected. As mentioned above, the application interface 210 may support the VCS 1 querying for a list of the connected applications available on the nomadic device 53. The user interface 300 may include a list control 302 configured to display the queried connected applications as selectable list entries 304. The user interface 300 may also include a title label 308 to indicate to the user that the user interface 300 is for utilizing the connected applications of the nomadic device 53.

As illustrated, the list control 302 of the connected application includes an entry 304-A for an Internet radio application and an entry 304-B for a location application 214. The list control 402 may operate as a menu, such that a user of the user interface 300 may be able to scroll through list entries of the list control 302 (e.g., using up and down arrow buttons and a select button to invoke the selected menu item 306). In some cases, the list control 302 may be displayed on a touch screen display 4, such that the user may be able to touch the list control 302 to select and invoke a menu item. For example, when the entry for the restaurant location application 214 is selected, the VCS 1 may send a command via the application interface 210 to the nomadic device 53, to cause the nomadic device 53 to initiate the restaurant location application 214. As another example, the vehicle HMI may support voice command selection of the menu items. For example, to invoke the restaurant location application 214, the user may press a push-to-talk button within the vehicle 31, and may speak the voice command "find points of interest."

The list control 302 may further include additional entries. For example, the "Find new Apps" entry 304-C, when invoked, may be configured to cause the VCS 1 to query the nomadic device 53 via the application interface 210 for an updated listing of the connected applications installed on the nomadic device 53. As another example, the "App settings" entry 304-D, when invoked, may be configured to cause the VCS 1 to display a user interface of settings for the connected applications functionality.

Figure 4:
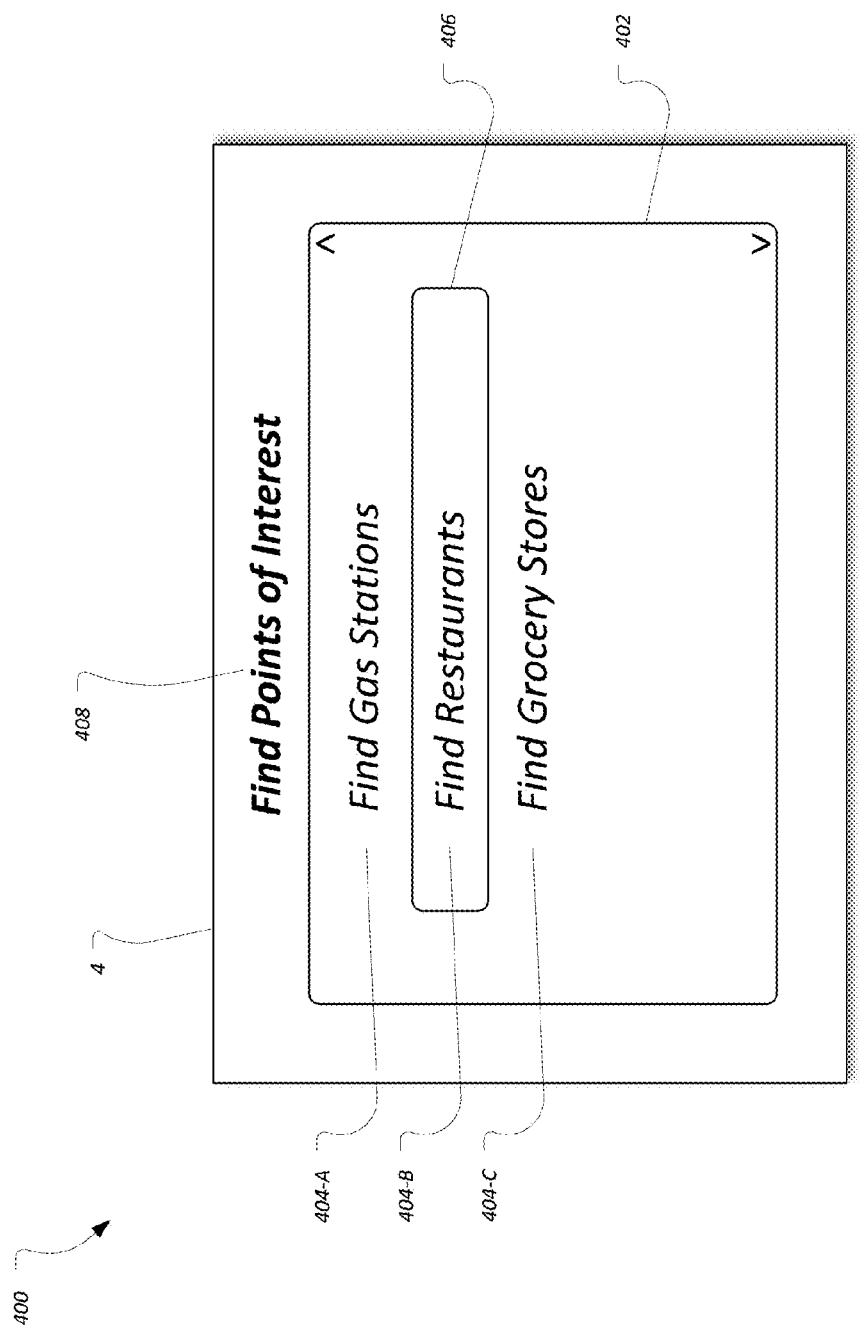
FIG. 4 illustrates an exemplary user interface of the location application.

FIG. 4 illustrates an exemplary user interface 400 of the location application 214. The user interface 400 may include a list control 402 configured to display a listing of possible location application 214 commands as selectable list entries 404. The user interface 400 may also include a title label 408 to indicate to the user that the user interface 400 is for utilizing the location application 214.

As illustrated, the list control 402 of the connected application includes an entry 404-A for requesting the location application 214 to query for augmented POI data 212 regarding gas stations, an entry 404-B for requesting the location application 214 to query for augmented POI data 212 regarding restaurants, and an entry 404-C for requesting the location application 214 to query for augmented POI data 212 regarding grocery stores. As with the list control 302 discussed above, the list control 402 may operate as a menu, and may further support selection of the available commands according to voice command (e.g., pressing the push-to-talk button within the vehicle 31 and speaking "find restaurants" would select the entry 402-B).

If the user selects one of the location application 214 commands from the list control 402, the location application 214 may be configured to query the location server 218 for augmented POI data 212 relating to the selected types of POI. For instance, if the user selects the entry 402-B (e.g., selected menu item 306), the location application 214 may be configured to query the location server 218 augmented POI data 212 relating to restaurants located within the vicinity of the vehicle 31. The vicinity may be defined, for example, as being within a predetermined distance (e.g., as specified by the VCS 1 or the location application 214) to the current location of the vehicle 31 (e.g., as determined according to GPS information available to the location application 214). As another example, the vicinity may be defined as being within a current zip code or other subsection of a map within which the vehicle 31 is determined to be located. In some cases, when the augmented POI data 212 is provided to the VCS 1 from the location application 214, the VCS 1 may be configured to switch to the display of the navigation application 206 (or the location application 214 may be configured to request via the application interface 210 to switch to the navigation application 206) to allow the user to view the received augmented POI data 212.

Figure 5:
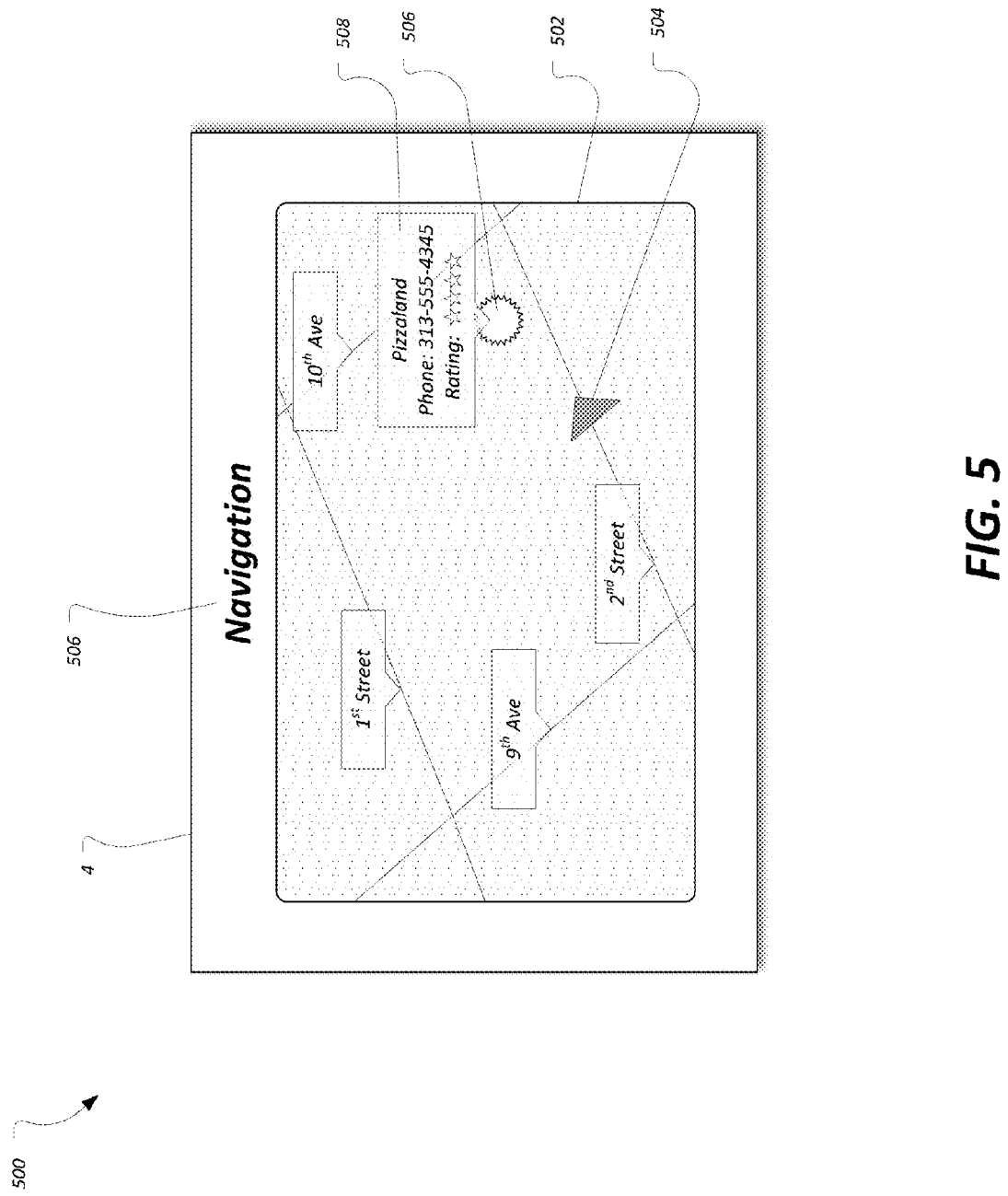
FIG. 5 illustrates an exemplary user interface of the navigation application of the vehicle-based computing system including augmented point-of-interest data.

FIG. 5 illustrates an exemplary user interface 500 of the navigation application 206 of the VCS 1 including augmented POI data 212. As illustrated, the user interface 500 includes a map 502 illustrating a current vehicle location 504. The map 502 further includes various details regarding the surroundings of the vehicle 31 determined from the map data 202, such as street placement and street names. The user interface 400 further includes a POI indication 506 based on location information of augmented POI data 212 received from the location application 214. The user interface 400 further includes a details indication 508 including further aspects of the POI, based on additional information regarding the POI included in the augmented POI data 212. Thus, the augmented POI data 212 may be made available for use by the navigation application 206, instead of or in addition to the POI data 204 of the VCS 1.

FIG. 6 illustrates an exemplary process 600 for providing augmented POI data 212 from the nomadic device 53 to the VCS 1. The process 600 may be performed, for example, by the nomadic device 53 in communication with the VCS 1 over the local data connection 208.

At operation 602, the nomadic device 53 activates the location application 214. For example, the nomadic device 53 may receive a request from the VCS 1 over the local data connection 208 for the location application 214. The request may be initiated, for example, upon user selection of the location application 214 from the user interface 300 of the VCS 1 from which connected applications may be selected. As another possibility, the location application 214 may be automatically requested by the navigation application 206 of the VCS 1.

At operation 604, the nomadic device 53 retrieves augmented POI data 212. For example, the location application 214 may be configured to query the location server 218 for the augmented POI data 212. As one possibility, the location application 214 may be configured to query the location server 218 over the data connection 216 for the augmented POI data 212 according to a current vehicle 31 location received from the VCS 1. As another possibility, the location application 214 may be configured to query the location server 218 over the data connection 216 for the augmented POI data 212 according to POI interest category information received from user input to the VCS 1.

At operation 606, the nomadic device 53 provides the augmented POI data 212 to the navigation application 206. For example, the location application 214 may provide the requested augmented POI data 212 to the VCS 1. The augmented POI data 212 may include, for one or more POIs, location information (e.g., GPS coordinates, street address, etc.), name information (e.g., business name, names of resident, etc.), as well as other information about the POI (e.g., hours of operation, images of the POI, web, e-mail or other Internet information associated with the POI, goods available at the POI such as a restaurant menu, reviews or rating of the POI, etc.). After operation 606, the process 600 ends.

FIG. 7 illustrates an exemplary process 700 for utilizing the location application 214 to provide augmented POI data 212 responsive to user input. The process 700 may be performed, for example, by the VCS 1 in communication with the nomadic device 53 over the local connection 208.

At operation 702, the VCS 1 connects to the nomadic device 53. For example, the connected application interface 210 of the VCS 1 may be configured to cause the VCS 1 to set up a local data connection 208 between the nomadic device 53 and the VCS 1. As one possibility, the data connection 208 may be established via a wireless Bluetooth connection. Additionally or alternately, the data connection 208 may be established over a wired USB connection.

At operation 704, the VCS 1 receives a user request to utilize the location application 214. For example, the VCS 1 may receive a request to utilize the location application 214 from a user interface screen such as the user interface 300 discussed in detail above.

At operation 706, the VCS 1 receives augmented POI data 212 from the nomadic device 53. For example, based on user input to the location application 214, the location application 214 may be configured to query a location server 218 for augmented POI data 212 regarding gas stations, restaurants, grocery stores, or some other type of POI within proximity to the current vehicle 31 location. The location application 214 may be configured to provide the queried augmented POI data 212 back to the VCS 1.

At operation 708, the VCS 1 switches to the navigation application 206. For example, responsive to receipt of the augmented POI data 212 (or in other cases responsive to an command from the location application 214 via the application interface 210), the VCS 1 may be configured to activate or display the navigation application 206 to allow the user to interact with the augmented POI data 212.

At operation 710, the VCS 1 utilizes the augmented POI data 212 for the navigation application 206. For example, the navigation application 206 may be configured to route to one or more POI included in the augmented POI data 212, or to display the augmented POI data 212 *t* the user (e.g., via display 4.) An exemplary user interface 400 of the navigation application 206 including augmented POI data 212 is discussed above with respect to FIG. 4.

At operation 712, the VCS 1 discards the augmented POI data 212. For example, the navigation application 206 may be configured to maintain the augmented POI data 212 until the navigation application 206 is terminated (e.g., upon vehicle 31 key-off). (It should be noted that in other cases, the augmented POI data 212 may be maintained by the vehicle 31 for further use, such as by updating the POI data 204 maintained the VCS 1.) After operation 712, the process 700 ends.

FIG. 8 illustrates an exemplary process 800 for utilizing the location application 214 to automatically provide augmented POI data 212 to the navigation application 206. As with the process 700, the process 800 may be performed, for example, by the VCS 1 in communication with the nomadic device 53 over the local connection 208.

At operation 802, the VCS 1 connects to the nomadic device 53. For example, the connected application interface 210 of the VCS 1 may be configured to cause the VCS 1 to set up a local data connection 208 between the nomadic device 53 and the VCS 1. As one possibility, the data connection 208 may be established via a wireless Bluetooth connection. Additionally or alternately, the data connection 208 may be established over a wired USB connection.

At operation 804, the VCS 1 identifies a change in vehicle 31 location. For example, based on GPS information available to the navigation application 206, the navigation application 206 may determine that the vehicle 31 has traveled to an area for which augmented POI data 212 is not available to the navigation application 206.

At operation 806, the VCS 1 receives augmented POI data 212 from the nomadic device 53. For example, the navigation application 206 may be configured to automatically request for the location application 214 to query a location server 218 for augmented POI data 212 regarding gas stations, restaurants, grocery stores, or some other type of POI within proximity to the current vehicle 31 location. The location application 214 may be configured to provide the queried augmented POI data 212 back to the VCS 1.

At operation 808, the VCS 1 utilizes the augmented POI data 212 for the navigation application 206. For example, the navigation application 206 may be configured to route to one or more POI included in the augmented POI data 212, or to display the augmented POI data 212 to the user (e.g., via display 4). An exemplary user interface 400 of the navigation application 206 including augmented POI data 212 is discussed above with respect to FIG. 4. Notably, the augmented POI data 212 may be utilized by the navigation application 206 instead of or in addition to the POI data 204 of the vehicle 31, allowing the vehicle 31 to automatically provide augmented POI data 212 when available, and default to the POI data 204 when it is not.

At operation 810, the VCS 1 discards the augmented POI data 212. For example, the navigation application 206 may be configured to maintain the augmented POI data 212 until the navigation application 206 is terminated (e.g., upon vehicle 31 key-off). (It should be noted that in other cases, the augmented POI data 212 may be maintained by the vehicle 31 for further use, such as by updating the POI data 204 maintained the VCS 1.) After operation 810, the process 800 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a nomadic device executing a location application and configured to
   connect to a vehicle computing system (VCS) over a local connection and to a location service over a wide-area connection,
   receive point-of-interest data over the wide-area connection from the location service, and
   provide the point-of-interest data to the VCS over the local connection to cause the VCS to switch from displaying a user interface of the location application executed by the nomadic device to displaying a user interface of a navigation application executed by the VCS.

2. The system of claim 1, wherein the local connection includes at least one of a Bluetooth connection and a universal serial bus (USB) connection, and the wide-area connection includes an Internet connection.

3. The system of claim 1, wherein the point-of-interest data includes a geographic location of a point-of-interest and a name of the point-of-interest.

4. The system of claim 1, wherein the location application is further configured to query the location service for the point-of-interest data according to a current vehicle location received from the VCS.

5. The system of claim 1, wherein the nomadic device is further configured to query the location service for the point-of-interest data according to a POI category received from the VCS.

6. The system of claim 5, wherein the POI category includes a category of business.

7. A system comprising:
   a vehicle computing system (VCS) configured to
   connect over a local connection to a nomadic device configured to execute a location application to connect to a location service over a wide-area connection,
   receive user interface input requesting point-of-interest data for use by a navigation application of the VCS,
   responsive to the input, send a command over the local connection to request the point-of-interest data from the location application, and
   switch from displaying a user interface of the location application executed by the nomadic device to displaying a user interface of the navigation application responsive to receipt of the point-of-interest data from the location application.

8. The system of claim 7, wherein the local connection includes at least one of a Bluetooth connection and a universal serial bus (USB) connection, and the wide-area connection includes an Internet connection.

9. The system of claim 7, wherein the navigation application is further configured to display the point-of-interest data in a user interface of the navigation application.

10. The system of claim 7, wherein the navigation application is further configured to calculate a route from a current vehicle location to a location included in the point-of-interest data.

11. The system of claim 7, wherein the navigation application is further configured to discard the point-of-interest data when the navigation application terminates.

12. The system of claim 7, wherein the navigation application is further configured to provide, to the location application, query information including at least one of a current location of the vehicle and a category of business, and the point-of-interest data received from the location application is queried according to the query information.

13. A system comprising:
   a vehicle computing system (VCS) configured to execute a navigation application to:
   provide a request for point-of-interest information to a location application of a nomadic device connected to the VCS over a local connection, the location application configured to integrate with a human-machine-interface of the VCS, the request including query information including at least one of a current location of the vehicle and a category of business,
   receive point-of-interest data from the nomadic device, the point-of-interest data being retrieved by the nomadic device from a remote server over a wide-area network,
   utilize the point-of-interest data to update point-of-interest information maintained by the VCS for use by the navigation application, and
   switch from displaying a user interface of the location application executed by the nomadic device to displaying a user interface of the navigation application responsive to receipt of the point-of-interest data from the location application.

14. The system of claim 13, wherein the navigation application is configured to provide the request for point-of-interest information responsive to a change in the current location of the vehicle.

15. The system of claim 13, wherein the navigation application is further configured to display the point-of-interest data in a user interface of the navigation application.

16. The system of claim 13, wherein the navigation application is further configured to calculate a route from a current vehicle location to a location included in the point-of-interest data.

17. The system of claim 13, wherein the navigation application is further configured to discard the point-of-interest data when the navigation application terminates.

18. A method comprising:
   receiving, by a nomadic device executing a location application, point-of-interest data over a wide-area connection from a location service, and
   providing the point-of-interest data from the location application to a vehicle computing system (VCS) over a local connection to cause the VCS to switch from displaying a user interface of the location application executed by the nomadic device to displaying a user interface of a navigation application executed by the VCS.

\* \* \* \* \*